Patented Apr. 29, 1952

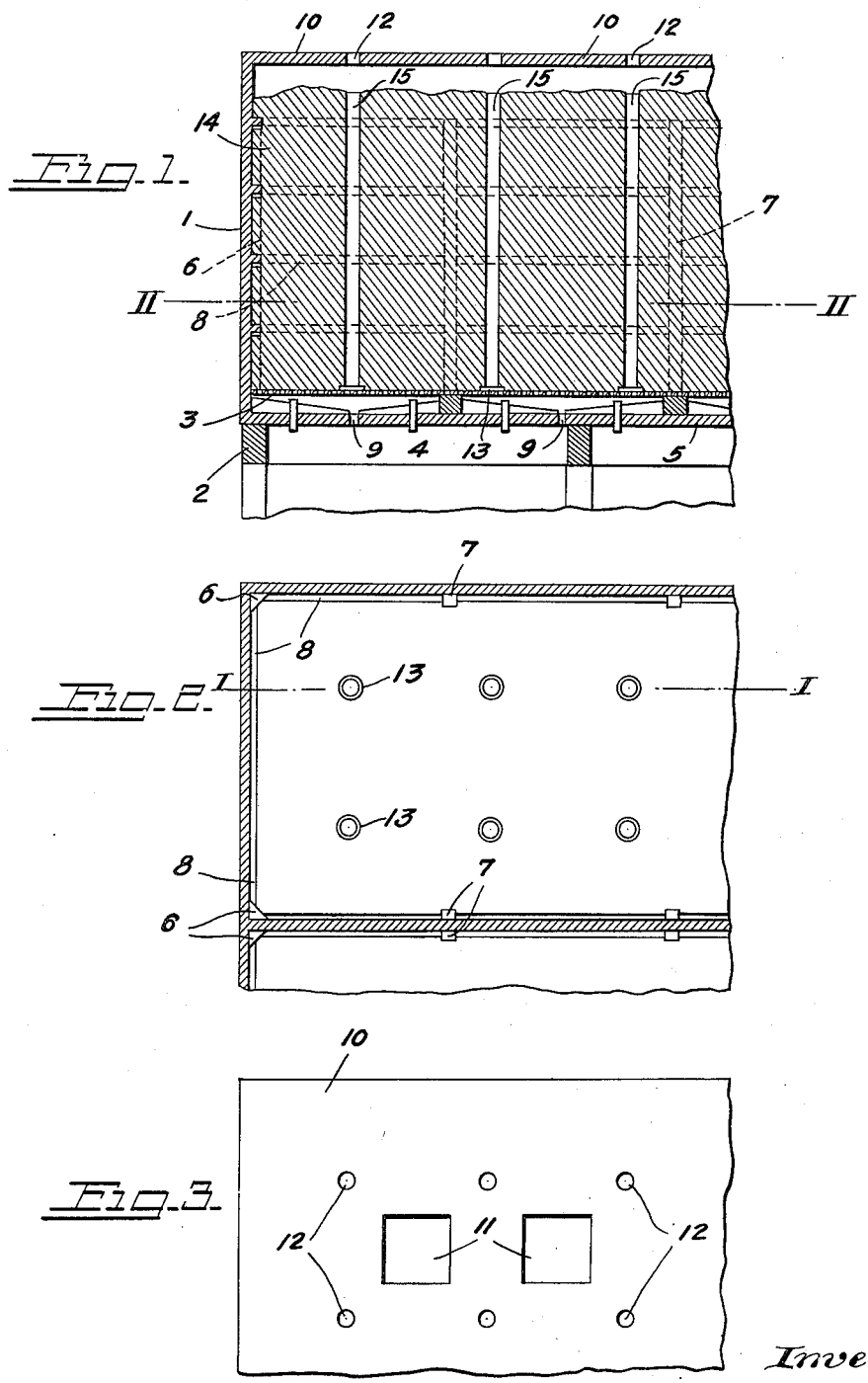

2,595,027

UNITED STATES PATENT OFFICE 2,595,027

METHOD AND MEANS FOR THE TREATMENT OF GARBAGE THROUGH FERMENTATION

Jean Gaston Charles Joseph Verdier, Cannes, France, assignor, by mesne assignments, to Biothermal Process Corporation, a corporation of New York Application August 8, 1947, Serial No. 767,622
In France March 17, 1944

6 Claims. (Cl. 195—128)

It is a well known fact that in the treatment of garbage through aerobic fermentation methods that derive mostly from the Beccari method as described in the French Patent No. 504,831 of October 14, 1919, serious difficulties are met with as soon as it is desired to reduce the surface of the plants and to increase thereby to a substantial extent the capacity of the fermentation cells. In particular the material settles and the air no longer engages the mass which becomes impervious to air; the oxidation which is the base of the aerobic method is no longer performed and on the contrary the slow process of anerobic fermentation is performed which in addition to its slow progress shows the drawback, of producing an evolution of ill-smelling gases including gases with an amine function and in particular sulphines.

It has already been proposed to remove this drawback by injecting into the mass of garbage, air under pressure by means of blowing pipes. This method has not received heretofore any application of any practical import. It has also been attempted to introduce into the mass metal chimneys constituted by perforated metal tubes. The latter are however subject to corrosion and it has been generally necessary to give up this idea by reason of the high cost price to be considered for a rather poor result.

My invention has for its object an improvement brought to the method for treating garbage of the type mentioned hereinabove with a view to allowing the use of fermentation cells of large capacity without detrimentally affecting the process of aerobic fermentation.

To this purpose, my invention consists chiefly in transforming the mass of garbage into an air-pervious mass through a reduction in its apparent specific weight.

I may use for this purpose the characteristic physical properties of garbage which shows, very little time after it has been deposited a natular slope that is vertical. As a matter of fact, when heaps of garbage of some considerable height, say 4 to 5 meters, are formed, the garbage speedily settles and thereafter, for instance two or three days later, the settled material may be cut into vertical slices without any collapse whatever occurring.

Starting from these facts, I provide, according to invention, in a mass of garbage undergoing treatment, empty spaces that are sufficiently near one another for the air to be capable of exerting its oxidising action at all points of said mass, this being obtained by providing in the fermentation cell vertical uprights round which the garbage is laid in a manner such that said uprights may pass throughout the mass. The uprights are left inside the mass of garbage during a time that is sufficiently long for the settling of the garbage to be obtained, say 3 to 4 days and after this time has elapsed, they are removed. By reason of the physical properties referred to hereinabove there remain in the mass vertical passages inside which the air may circulate and wherethrough a lowering of the average specific weight of the garbage is obtained, said garbage being thus pervious to air.

In practice, for the execution of the invention, it is possible to use cylindrical uprights, or better still, uprights that are slightly frustoconical for making their removal easier. These uprights may be constituted by solid members of wood for instance or else be constituted by tubes of thin metal sheet. Their diameter may be of a magnitude of 20 to 25 centimeters. Generally speaking, it is preferable to distribute said uprights inside the mass of garbage in a manner such that at no point of the latter they may stand at more than about 1.50 meters from an air admitting opening.

On the other hand, in order to further the cell filling operations and the removal of the uprights, it is preferable to submit the garbage to a preliminary crushing in order to bestow a certain physical homogeneity to it.

My invention may be advantageously applied with aerobic fermentation cells of conventional type, that is cells including a filtering floor, aeration chimneys at the angles and along the sides and elongated air distributing members, which cells provide in practice excellent results. But whereas the capacity of the cells cannot generally rise beyond 20 to 25 cubic meters, my invention allows increasing said capacity up to 100 cubic meters and considerably beyond, without any substantial slowing down of the aerobic fermentation process.

A form of execution of the invention is illustrated by way of example and by no means in a limiting sense in the accompanying drawings, wherein:

Fig. 1 is a partial vertical cross-sectional view through line I—I of Fig. 2 of a fermentation cell to which my invention is incorporated.

Fig. 2 is a horizontal cross-section through line II—II of Fig. 1.

Fig. 3 is a plan view of the cell at the level of the upper platform.

In the cell shown by way of example, I designates the parallelopipedic body of a fermentation cell of the Beccari type that rises in accordance with usual practice above a floor 2 of reinforced concrete.

The conventional features of such a cell are shown in the drawings, to wit: at 3 the filtering floor underneath which air is brought through the air intakes 4 passing through the rough masonry 5, at 6 and 7 the angular and lateral aeration chimneys inside which said air rises and at 8 the channels for the distribution of the air fed thereby to the aeration chimneys. Inside the rough masonry 5 are also provided the pipes 9 for the removal of the liquids while the upper platform 10 (see Fig. 3) includes openings 11 for the loading of the garbage.

In the upper platform 10 are also provided the circular openings 12 for the introduction of the uprights that are to provide according to my invention, vertical empty spaces inside the mass of garbage in order to reduce the apparent specific weight of the garbage and to make it pervious to air. There are provided in the filtering floor 3, coaxially with the openings 12, guiding rings 13 for centering and holding said uprights. The fermentation operation with such an arrangement is as follows:

The cell 1 being empty, the uprights that are not illustrated are set in place and held vertically on one hand at their lower ends through the corresponding guiding rings 13 and on the other hand at their upper ends through the openings 12 that have served for their introduction. The garbage is then caused to fall into the cell through the filling openings 11. When the cell is completely filled, said filling openings are closed.

The fermentation then begins and therewith the settling of the garbage. After 3 to 4 days, the settling has progressed sufficiently for it to be possible to remove the uprights and this removal is made easier by the slightly frustoconical shape that is given to said uprights. There remain then in the mass of garbage 14 vertical empty spaces 15 corresponding to the location of the uprights before their removal.

Preferably the uprights are arranged approximately at 1.50 meters from the lateral walls of the cell and they are spaced with reference to one another by about 2 meters whereby no point of the mass of garbage lies at more than about 1.50 meters from an air admission opening.

What I claim is:

1. A method for treating garbage by aerobic fermentation in a cell having air admission openings, which comprises inserting vertical uprights in the fermentation cell at a plurality of points spaced inwardly of the walls of the cell, filling the cell with garbage to form a mass throughout which the said uprights pass, allowing the garbage to settle, and subsequently removing said uprights to provide empty columnar spaces in the settled mass of garbage for increasing the admission of air into said mass.

2. A method for treating garbage by aerobic fermentation as defined in claim 1, wherein the uprights are cylindrical in shape to provide cylindrical passageways for air extending vertically through the settled mass of garbage.

3. A method for treating garbage by aerobic fermentation as defined in claim 1, wherein the uprights are of frustoconical shape with their smaller ends at the bottom to provide passageways of increasing diameter from the bottom toward the top and extending through the settled mass of garbage.

4. A method for treating garbage by aerobic fermentation as defined in claim 1, wherein the uprights are distributed so as to lie at no more than about 1.50 metres from an air admission opening.

5. A method for treating garbage by aerobic fermentation in a cell having air admission openings, which comprises inserting vertical uprights within the fermentation cell, fitting the cell with garbage to form a mass of garbage throughout which the said uprights pass, allowing the garbage to settle for about three to four days, and removing the said uprights to form empty spaces in the settled mass of garbage inwardly of the walls of the cell to increase the circulation of air inside said mass.

6. A method for treating garbage by aerobic fermentation in a cell having air admission openings, comprising providing vertical uprights inside the said fermentation cell, submitting the garbage to a crushing action outside the cell, filling the cell with the crushed garbage to form a mass of garbage throughout which the said uprights pass, allowing the garbage to settle, and removing said uprights after settling of the garbage to form empty spaces in the settled mass of garbage for increasing the circulation of air inside said mass.

JEAN GASTON CHARLES
JOSEPH VERDIER.

REFERENCES CITED

The following references are of record in the file of this patent:

UNITED STATES PATENTS

| Number | Name | Date |
| --- | --- | --- |
| Re. 15,417 | Beccari | July 25, 1922 |
| 2,049,889 | Boniface | Aug. 4, 1936 |